Nov. 26, 1968   T. M. MOORE   3,413,635
SYSTEM AND METHOD OF PHASE CODING PULSES OF MICROWAVES
Filed Jan. 16, 1967                    2 Sheets-Sheet 1

WITNESSES
Theodore F. Wrobel
James F. Young

INVENTOR
Thomas M. Moore
BY R. Lewis Gable
ATTORNEY

United States Patent Office 3,413,635
Patented Nov. 26, 1968

3,413,635
SYSTEM AND METHOD OF PHASE CODING
PULSES OF MICROWAVES
Thomas M. Moore, Severna Park, Md., assignor to Westinghouse Electric Corporation, Pittsburgh, Pa., a corporation of Pennsylvania
Filed Jan. 16, 1967, Ser. No. 609,475
11 Claims. (Cl. 343—17.2)

ABSTRACT OF THE DISCLOSURE

This invention relates to a system and method for phase coding pulses generated by a magnetron tube in order to achieve upon reception an effective pulse compression. More specifically, a load is placed upon the output of the magnetron tube in order to change the frequency of a portion of the output pulse and in turn, to effect a phase change of 180° within one bit length. Typically, these pulses of microwaves are radiated onto a target by a radar system and an echo is received therefrom by an appropriate receiver including appropriate circuits for delaying the received signal in a sequential series of steps or bits by an amount dependent upon the bit length, and circuits for summing the delayed series of signal bits in order to achieve a pulse compression effect.

---

Figure 1:
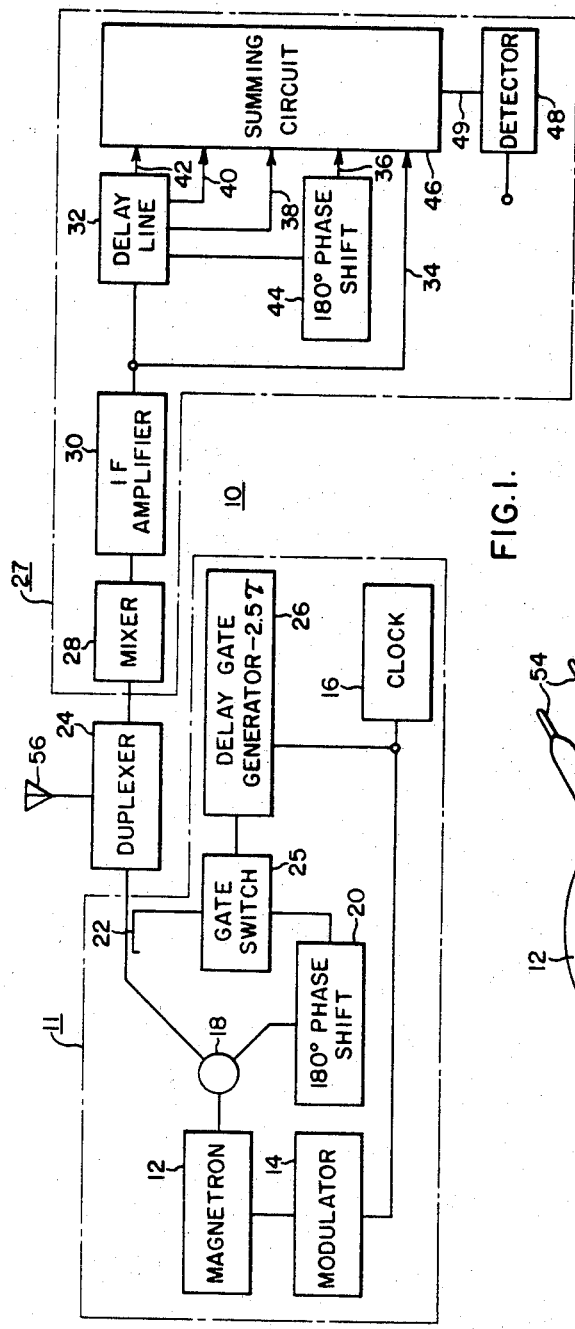

This invention relates to systems for the methods of pulse compressing the output signal of an electron discharge device whose frequency is dependent upon the load placed thereon and more specifically to such systems and methods of operating a magnetron tube.

The use of magnetrons in radar systems is desired because these devices are relatively inexpensive as compared with other high power, high frequency electron discharge devices. However, magnetron tubes have definite limits as to the average power and peak power of which these devices are capable. In radar systems where it is necessary to achieve high resolution, the source of microwave energy has to be able to generate very narrow pulses at very high, peak power levels. Typically, the peak power capabilities of magnetron tubes may be exceeded by the requirements of high resolution radar systems. Further, the noncoherent characteristics of the magnetron tube makes signal coding difficult while resolution requirements exclude the use of long pulses.

It is, therefore, an object of this invention to provide a new and improved method and system for operating an electron discharge device, the frequency of whose output signal is dependent upon the load placed thereon so as to achieve an effective pulse compression of the output signal of this device.

It is a further object of this invention to provide a new and improved method and system of operating an electron discharge device such as a magnetron tube to achieve the effect of relatively short pulses at a high peak power.

These and other objects are accomplished in accordance with the teachings of the present invention by providing a new and improved system and method of operating an electron discharge device such as a magnetron tube, the frequency of whose output signal is dependent upon the load placed thereon. More specifically, a load of sufficient magnitude is placed upon the output of the electron discharge device in order to change the frequency of the output signal sufficiently to effect a given phase change within a predetermined time. In order to achieve pulse compression, the output signal of the electron discharge device is considered to contain a plurality of bits of given time interval, and a phase change within one bit is effected by changing the frequency of the output signal. Such a pulse compression system would be used typically in a radar system where the phase coded pulse is radiated onto a target. The echo signal from the target is detected by a receiver, which introduces successive time delays to the echo signal and sums the phase delayed signals in order to achieve the desired pulse compression.

In one particular embodiment of this invention, a magnetron tube is incorporated into the system of this invention. An appropriate load is placed upon the output of the magnetron tube by feeding back a portion of the output signal in which a 180° phase change has been effected. In one particular method of operation, the output of the magnetron tube is coded on the basis of a perfect 5 bit phase code wherein a load is placed upon the output of the electron discharge device at a time corresponding to 2.5 bit lengths after the initial rise of the pulse. The load is of sufficient magnitude to effect a phase change of 180° within one bit length.

Figure 4:
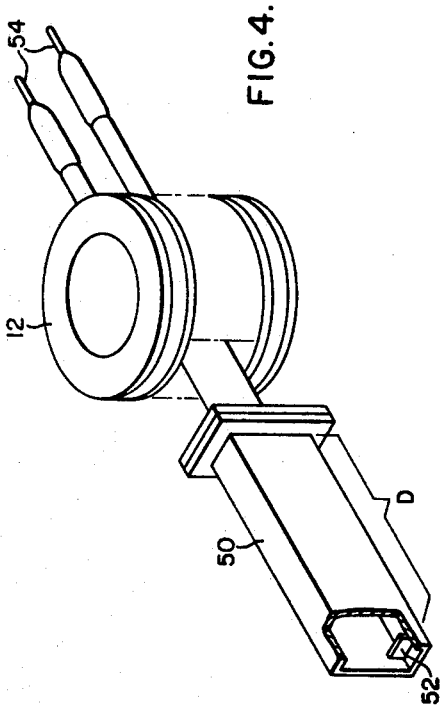
Figure 2A:
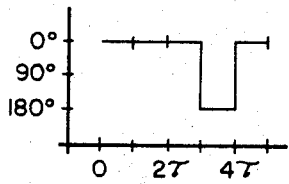
Figure 2B:
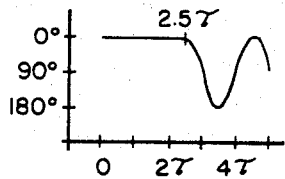
Figure 2C:
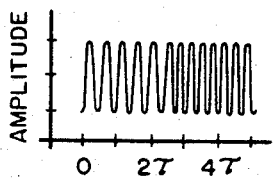
Figure 3A:
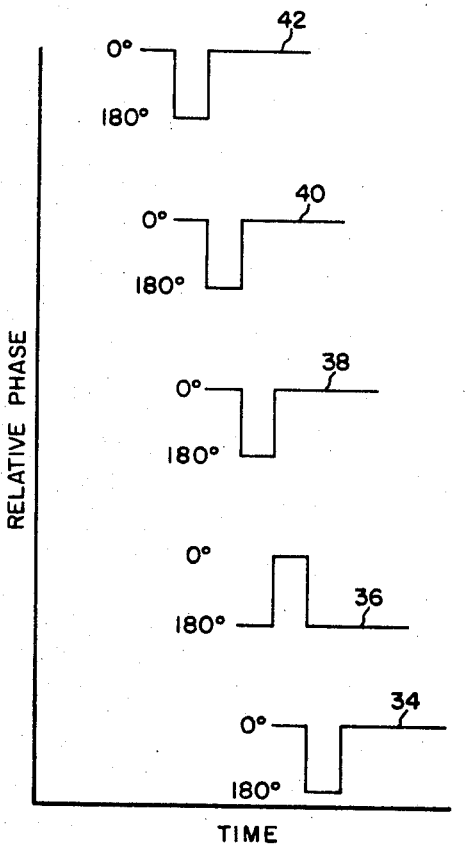
Figure 3B:
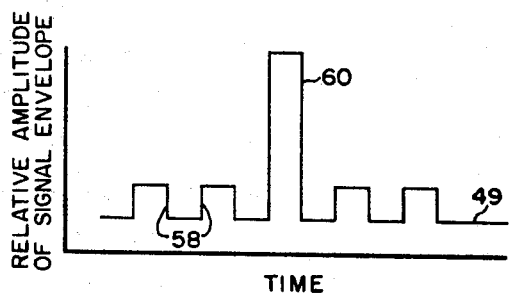

These and other objects and advantages of the present invention will become more apparent when considered in view of the following detailed description and drawings, in which:

FIGURE 1 is a schematic representation of a radar system incorporating the teachings of this invention;

FIGS. 2a and 2b, and FIG. 2c are respectively graphical presentations of the effects of placing a load upon the electron discharge device as to the phase and the frequency of the output signal;

FIGS. 3a and 3b are a graphical representation of the addition process which occurs in the receiver of the radar system of FIG. 1; and FIG. 4 is an orthogonal view of an alternative embodiment of this invention.

Referring now to the drawings and in particular to FIG. 1, there is shown a radar system 10 capable of being operated in accordance with the pulse compression technique of this invention. More specifically, the radar system 10 includes a transmitter 11 for generating a series of phase coded pulses of microwave frequencies which will be radiated by an antenna 56 onto the object whose position is to be measured. A suitable electron discharge device, the frequency of whose output signal is dependent upon the load disposed thereon, such as a magnetron 12 is energized by a modulator 14 in order to provide a pulse to a suitable coupler 18 such as a ferrite circulator of the type 1021A as manufactured by the Hughes Aircraft Company. In turn, the coupler 18 transfers the output signal of the magnetron tube 12 to a duplexer 24 which alternately switches the antenna 56 to the transmitter 11 or to a receiver 27.

In accordance with the teachings of this invention, a load is placed upon the output of the magnetron 12 in order to effect a change of frequency of the output signal of the magnetron tube 12. The relative changes of frequency as a function of the load placed upon a magnetron are typically plotted on curves known as Rieke diagrams. In one particular embodiment of this invention, a suitable magnetron such as the 2J70AL type manufactured by the Raytheon Corporation could be incorporated within the transmitter 11. The frequency shift of a magnetron is quite rapid requiring only a few cycles of the transmitted frequency, and the frequency shift is relatively stable without further change in the load. This invention uses the frequency characteristic of a magnetron to create the desired phase change by feeding back a component of the output signal of the magnetron 12 at the time when the change in phase is required. As shown in FIG. 1, this may be illustratively accomplished by a coupler 22 for transferring a small component of the output microwave energy to a gate switch 25 for selectively applying the microwave energy to a suitable phase adjusting device 20 such as a microwave time stretcher. The phase shifter 20 provides a 180° phase change in the component of microwave energy and applies the out of phase component to the magnetron 12 through the ferrite circulator 18. Illustratively, the coupler 22 may be a Nurda type 1074-(20) and the gate switch 25 may be a type MA 8304–152N as manufactured by Microwave Associates. The amount of feedback required is a function of the characteristics of the magnetron tube 12 and the required rate of change of phase; normally the coupler 22 may supply a feedback component on the order of 20 to 40 db down from the transmitted signal to be phase shifted approximately 180° by the shifter 20. The gate switch 25 is controlled by a delay gate generator 26 which provides a gating signal to the switch 25 to insure that the load is placed upon the magnetron 12 at the appropriate time. The operations of the transmitter 11 are synchronized by an appropriate clock circuit 16 which is connected to the modulator 14 and the delay gate generator 26.

In accordance with the teachings of this invention, it is desired to phase code the pulses generated by the magnetron 12 and more particularly to establish a perfect 5-bit coded pulse. Referring now to FIG. 2a, there is shown the idealized phase relationship of a 5-bit coded pulse where width of one bit is $\tau$. More specifically, the phase of the first three and fifth bits is approximately 0°, whereas the phase of the fourth bit is 180° out of phase with the remaining bits. As shown in FIG. 2a the phase of the pulse cannot be instantaneously changed, and that the curve of an actual magnetron tube would appear more rounded as shown in FIG. 2b. Referring now to FIG. 2c, there is shown illustratively a wave whose frequency has been shifted so that the phase of the wave of the fourth bit (i.e. that portion of the wave between 3 and $4\tau$) is out of phase with the remaining portions of the wave corresponding to the first, second, third, and fifth bits of the pulse or burst of microwave energy. As shown in FIGS. 2c and 2b, the change of frequency and the change of phase respectively begin at $2.5\tau$. At this time, the delay gate generator 26 pulses the gate switch 25 in order to close the circuit between the coupler 22 and the magnetron 12 thereby placing a load upon the output of the magnetron tube 12. Within a very few cycles, the frequency of the output signal of the magnetron tube 12 is shifted to a new frequency which will remain constant as long as the load is still applied to the magnetron tube 12. The change of frequency in turn effects the relative phase of the wave within the fourth bit with respect to the phase of the other bits of the pulse. It is desired according to the teachings of this invention that the phase of the wave be shifted 180° within 1-bit length. In turn, the load placed upon the magnetron tube must be sufficient to change the frequency so that the period of the frequency shift is equal approximately to twice the length of a single bit. Conversely, the width of one-half the period of the frequency shift should be equal to one bit of the pulse. The frequency shift imposed upon a signal of a given frequency will cause the phase of the shifted frequency to go gradually out of phase with the original signal. At a point in time equal to one-half of the length of the period of the frequency shift, the shifted signal will be 180° out of phase with the original signal. Therefore, as shown in FIGS. 2b and 2c, if such a frequency difference is placed the signal at a time $2.5\tau$, the phase of the signal at time $3.5\tau$ will be 180° out of phase with the original signal. Illustratively, if a pulse of a signal having a frequency of 3000 megacycles per second is generated by the magnetron tube 12 and a frequency shift of 2.5 megacycles is imposed upon the signal, the length of a full cycle of the frequency shift would be 0.4 microsecond and the corresponding length of one bit would be 0.2 microsecond. Similarly, the length of the entire pulse would be 1 microsecond.

The series of pulses generated by the transmitter 11 are switched by the duplexer 24 onto the antenna 56 to be radiated onto a target to determine the position of the target. Echo signals are returned to the antenna 56 which are directed by the duplexer 24 to a mixer 28 of the receiver 27. The mixer 28 converts the radio frequency echo signal to an IF signal which, in turn, is applied to an IF amplifier 30. The IF amplifier 30 provides a sufficient gain to amplify the echo signal above the inherent noise of the receiver 27. After being applied to the mixer 28 and the IF amplifier 30, the pulses of the return or echo signal are applied to a delay line 32. The function of the delay line 32 is to delay the application of the coded pulse incremental lengths of time corresponding to the length of a bit. As shown in FIG. 1, a pulse is applied by a suitable conductor such as a coaxial cable 34, which is connected to the IF amplifier 30, at a first moment in time to a summing circuit 46. The delay line 32 delays the same pulse and applies the delayed pulse to a phase shifter 44 capable of imparting a phase shift 180° to the delayed pulse which is then applied by a coaxial cable 36 to the summing circuit 46. As shown in FIG. 3a, the pulse applied by the coaxial cable 36 to the summing circuit 46 is delayed by a period of time equal to a bit and has its phase shifted by 180°. In a similar manner, the delay line 32 delays and applies the pulse along a coaxial cable 38 to the summing circuit 46 at a point delayed in time by a bit as compared with the application of the pulse along coaxial cable 36. Similarly, the delayed line 32 further delays the pulse and applies it along a coaxial cable 40 at a point in time delayed by one bit as compared with the application of the pulse along coaxial cable 38. Still further, the delay line 32 further delays the pulse by a single bit (as compared with the application of the pulse applied by the coaxial cable 40) and applies the delayed pulse along coaxial cable 42 to the summing circuit 46. The summing circuit 46 in effect adds the pulses applied by the coaxial cables 36, 38, 40 and 42 to the pulse applied along coaxial cable 34. FIGURE 3b shows the amplitude of the envelope of the signal derived from the summing circuit 46. By imparting particular amounts of delay and phase shifts to the input signals applied to the summing circuit 46, these signals may be added together to cancel out of phase components and to reinforce the signal where the phases of the input signals are in phase. A compressed pulse 60 results having a peak whose amplitude is in the order of five times greater than the amplitude of the sidelobes 58. The output signal is carried by a suitable coaxial cable 49 to a detector 48 which operates to detect the envelope of the IF output signal from the circuit 46 to provide a corresponding DC signal. Thus FIG. 1 shows a radar system in which the magnetron tube 12 may be bit phase coded so that the return or echo signal may be appropriately delayed, phase shifted and then summed by a circuit 46 to provide a compressed pulse 60 of a peaked power level.

The rounding of the phase characteristics of the bit coded pulse has the effect of peaking of the compressed pulse 60 and the sidelobes 58 somewhat without appreciably changing the peak to sidelobe level. This rounding effect together with the loss of output due to the feedback will normally limit the gain in peak power to about 6 db rather than the ideal gain of 7 db.

It is readily apparent that this invention can take any number of forms without changing from the basic principles of this invention. Referring to FIG. 4, there is shown a very simple structure for imposing a load at the correct time upon magnetron tube 12. More specifically, a suitable discontinuity such as partition 52 may be placed at a proper distance D along a waveguide 50 which is connected to the magnetron 12 to effect a change of the load of magnetron 12 after a period equal to the two way travel of the microwave energy to the discontinuity and back to the magnetron tube 12. This period of time is of such a length to allow the load to be placed on the magnetron tube 12 at a time corresponding to $2.5\tau$. The discontinuity placed in the waveguide 50 may illustratively take the form of an opening or a duct in the waveguide. However, this embodiment of the invention is limited essentially to operation at one frequency.

Since numerous changes may be made in the above-described apparatus and different embodiments of the invention may be made without departing from the spirit thereof, it is intended that all matter contained in the foregoing description and shown in the accompanying drawings shall be interpreted as illustrative and not in a limiting sense.

I claim as my invention:

1. A radar system comprising a phase coding transmitter, said transmitter including a source of microwave pulses to be coded into a predetermined number of bits, said source having the property of varying the frequency of said microwave pulses in response to varying loads disposed thereon, and means for disposing a load upon said source of sufficient magnitude to change the frequency of a portion of said microwave pulses thereby effecting a phase change of substantially 180° in at least one of said bits with respect to the remaining bits within a time period corresponding substantially to the length of one bit; and a receiver to which are applied a plurality of echoes of the transmitted microwave pulses, said receiver including summing means, and means for storing one of said echoes, and applying delayed signals corresponding to said one echo to said summing means at intervals of time corresponding to one of said bits, said summing means adding said delayed signals to provide an output signal having a portion of increased amplitude.

2. A radar system as claimed in claim 1, wherein said source includes a magnetron device.

3. A radar system as claimed in claim 1, wherein said means for disposing a load includes means for coupling a portion of said microwave pulses generated by said source, and means for imposing a phase shift upon said coupled portion and for applying to the output of said source said phase shifted portion to thereby place a load upon said source.

4. A system for phase coding a pulse of microwaves comprising a source of microwave pulses having the property of varying the frequency of said pulses in response to loads disposed thereon, said pulses being coded into five bits, and means for disposing a load upon said source of sufficient magnitude to change the frequency of a portion of said microwave pulses and to effect a phase change within at least one bit of said pulse of substantially 180° with respect to the other of said bits within a time period corresponding to the length of one of said bits.

5. A system of phase coding as claimed in claim 4, wherein said means for disposing a load is activated at a point in time 2.5 bit lengths after the beginning of said pulse to thereby effect a change in the phase of the fourth bit of said five bit pulse with respect to the remaining bits of said pulse.

6. A system for phase coding as claimed in claim 5, wherein said source of microwave pulses is a magnetron device.

7. A method of operating an electron discharge device for generating microwave pulses, said electron discharge device having the property of varying the frequency of said microwave pulses in response to varying loads disposed thereon, said method including the steps of operating said electron discharge device to generate microwave pulses and coding said pulses into five bits, and disposing a load upon said electron discharge device of sufficient magnitude to change the frequency of a portion of one of said microwave pulses and to effect a phase change within at least one bit of said pulse of substantially 180° with respect to the remaining bits of said pulse within a time period corresponding to the length of one bit.

8. A method of operating an electron discharge device as claimed in claim 7, wherein the step of placing said load on said electron discharge device is performed by deriving a component of said microwave pulses, effecting a phase shift upon said component, and applying said phase shifted component to the output of said electron discharge device.

9. A method of operating an electron discharge device as claimed in claim 7, wherein said load is placed on said electron discharge device at a point in time corresponding to the length of 2.5 bits after the initial rise of said pulse.

10. A method of operating an electron discharge device as claimed in claim 7, wherein one of said pulses is stored, delayed signals corresponding to said stored pulse are provided at points in time spaced from each other by intervals corresponding to one of said bits, and summing said delayed signals to provide an output pulse having a portion thereof of increased amplitude.

11. A method of operating a radar system including an electron discharge device for generating pulses, said electron discharge device having the property of varying the frequency of said pulses as a function of the load disposed thereon, said method including the steps of generating and transmitting a series of microwave pulses, coding said pulses into five bits, disposing a load upon said electron discharge device of sufficient magnitude to change the frequency of a portion of said microwave pulses and to thereby effect a phase change within the fourth bit of said five bit pulse of substantially 180° with respect to the remaining bits within a period of time corresponding to one bit, receiving a plurality of echoes of said transmitted microwave pulses, storing one of said echoes, providing first, second, third, fourth and fifth delayed signals corresponding to said one echo, delaying said second signal by a length of time corresponding to one bit and shifting the phase of said second signal by 180° with respect to said first signal, delaying said third signal by a length of time corresponding to two bits with respect to said first signal, delaying said fourth signal by a length of time compared to three bits with respect to said first signal, delaying said fifth signal by a time corresponding to four bits with respect to said first signal, and summing said first, second, third, fourth and fifth signals to provide a compressed output signal having a portion whose amplitude is greater than said echo.

References Cited

UNITED STATES PATENTS

| | | | |
|---|---|---|---|
| 2,994,790 | 8/1961 | Delaney | 332—9 X |
| 3,004,155 | 10/1961 | Brite | 332—9 X |
| 3,020,485 | 2/1962 | Secretan | 329—104 |
| 3,023,269 | 2/1962 | Maniere | 178—67 X |
| 3,207,851 | 9/1965 | Fukinuki | 179—15 |
| 3,216,013 | 11/1965 | Thor | 343—17.2 |
| 3,246,260 | 4/1966 | Clayton | 332—9 |
| 3,249,937 | 5/1966 | As et al. | 343—17.2 X |
| 3,290,678 | 12/1966 | Carlsson | 343—17.2 X |
| 3,305,636 | 2/1967 | Webb | 178—67 |
| 3,308,459 | 3/1967 | Carlsson et al. | |

RODNEY D. BENNETT, *Primary Examiner.*

J. P. MORRIS, *Assistant Examiner.*